Feb. 28, 1950  E. FLOMEN  2,498,948
APPARATUS FOR SHIRRING SAUSAGE CASINGS
Filed Aug. 2, 1947  3 Sheets-Sheet 1

INVENTOR
EDWARD FLOMEN
BY Fetherstonhaugh & Co.
ATTORNEYS

Feb. 28, 1950 E. FLOMEN 2,498,948
APPARATUS FOR SHIRRING SAUSAGE CASINGS
Filed Aug. 2, 1947 3 Sheets-Sheet 2
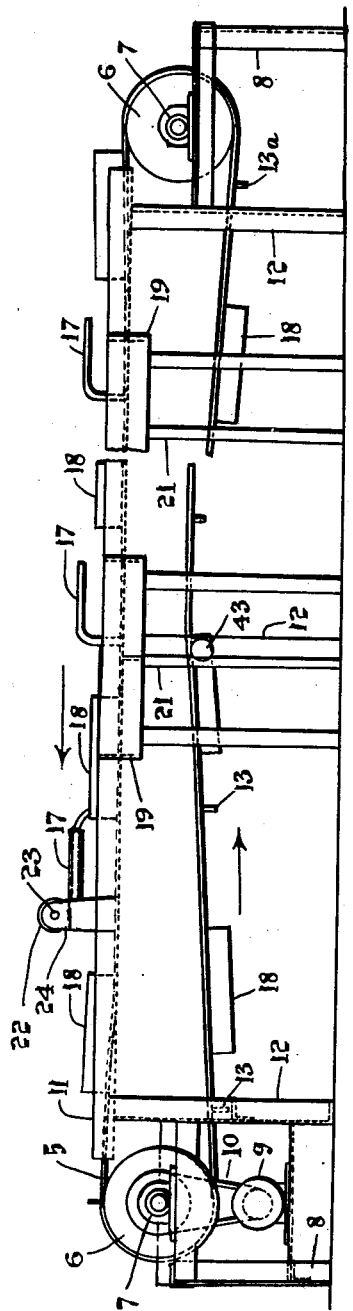
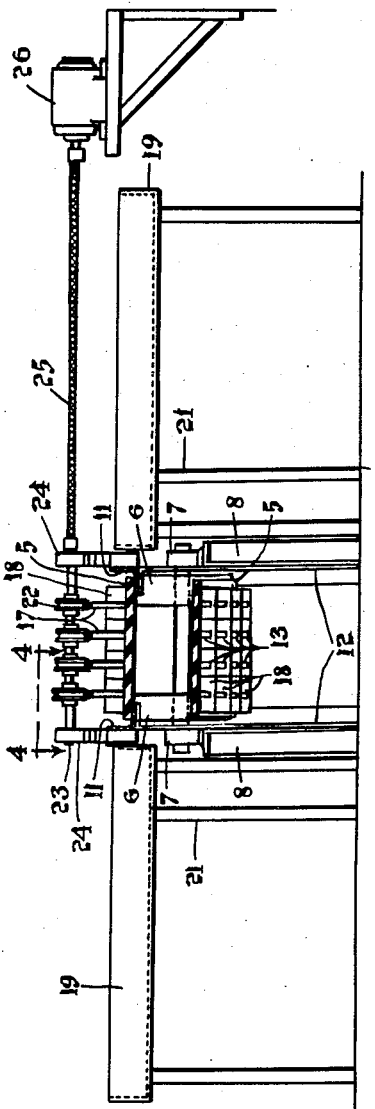
INVENTOR
EDWARD. FLOMEN
by Fetherstonhaugh & Co.
ATTORNEYS

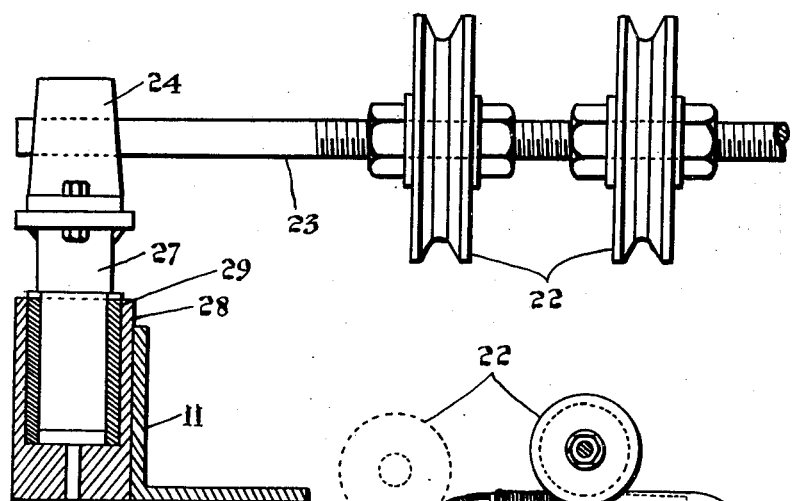
FIG.4
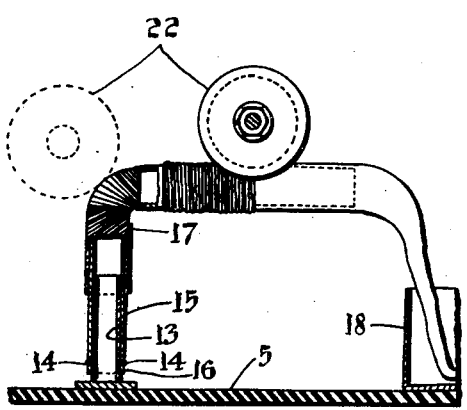
FIG.5
FIG.7
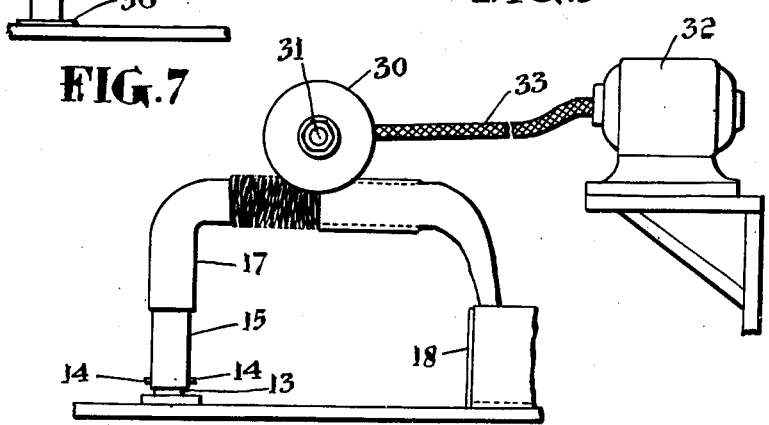
FIG.6
INVENTOR
EDWARD FLOMEN

Patented Feb. 28, 1950

2,498,948

UNITED STATES PATENT OFFICE 2,498,948

APPARATUS FOR SHIRRING SAUSAGE CASINGS

Edward Flomen, Montreal, Quebec, Canada

Application August 2, 1947, Serial No. 765,801

9 Claims. (Cl. 17—35)

This invention relates to improvements in apparatus for shirring natural sausage casings onto mandrels provided therefor.

The primary object of this invention is to eliminate casing wastage and to reduce labour time and costs in the preparation of casings for the manufacture of sausages.

Another object is to provide a novel combination mandrel assembly including a storage mandrel and a shirring mandrel mounted thereon whereby a sausage casing may be shirred onto said shirring mandrel and subsequently transferred to said storage mandrel.

A further object of this invention is to provide a rotary shirring mechanism frictionally engageable with sausage casings on the shirring mandrels of the character described to enable said casings to be transferred to storage mandrels in a shirred condition.

A still further object of this invention is to provide a conveyor belt assembly having shirring mandrels mounted thereon, said conveyor belt being adapted to move the mandrels through a shirring station of the character described for shirring sausage casings on said mandrels.

Heretofore natural sausage casings have been put up in units of sale such as hanks, skeins, bundles, etc. Generally a hank, skein, bundle, etc., consists of from six to thirty strands of casings of varying lengths to a total of from one hundred to two hundred yards of casings in all. These units are packed in dry salt and further packed into tight coopered barrels or tierces in a compact mass. When these units are delivered to sausage manufacturers they are in a substantially solid mass and the manufacturer must separate the strands by hand, process them through water to soften them and wash out the brine and then shir the casing onto a stuffing horn. This last operation is usually done by hand and is an extremely expensive and tedious operation. The hank, if not carefully handled by competent, experienced operators, tangles very easily when being separated or stranded. The result is that, in addition to being lengthy and therefore costly from a labour point, a very high percentage of waste in the casings is encountered.

My invention, as herein described, eliminates all of the aforementioned difficulties, as each strand of casing, after the initial cleaning and grading process, may be shirred onto a shirring mandrel and directly transferred to a storage mandrel which is shipped to the sausage manufacturer ready to be applied to the stuffing horn in its shirred condition. Such a shirred casing on a storage mandrel need not be further processed or handled by the sausage manufacturer except to transfer it to his stuffing horn.

My apparatus may also be set up for the purpose of shirring the casings which have been shipped in hanks, skeins, bundles, etc. In this connection, one such plant could afford to employ skilled operators for separating and processing the strands and then shirring the casings onto mandrels for supplying the sausage manufacturers with the shirred product which is ready for the stuffing horn.

The above and other objects, advantages and characteristic features of my invention will be more readily understood from the following detailed description taken in connection with the accompanying drawings, in which:

Fig. 2 is a side elevational view of the apparatus shown in Fig. 1.

Fig. 3 is a sectional view taken along the line 3—3 of Fig. 1.

Fig. 4 is an enlarged sectional view taken along the line 4—4 of Fig. 3.

Fig. 5 is an enlarged view of one of the mandrel assemblies as they appear in Fig. 2.

Fig. 6 is a view similar to Fig. 5 but showing a modified shirring mechanism.

Fig. 7 is a view showing a modified shirring mandrel.

Figure 1:
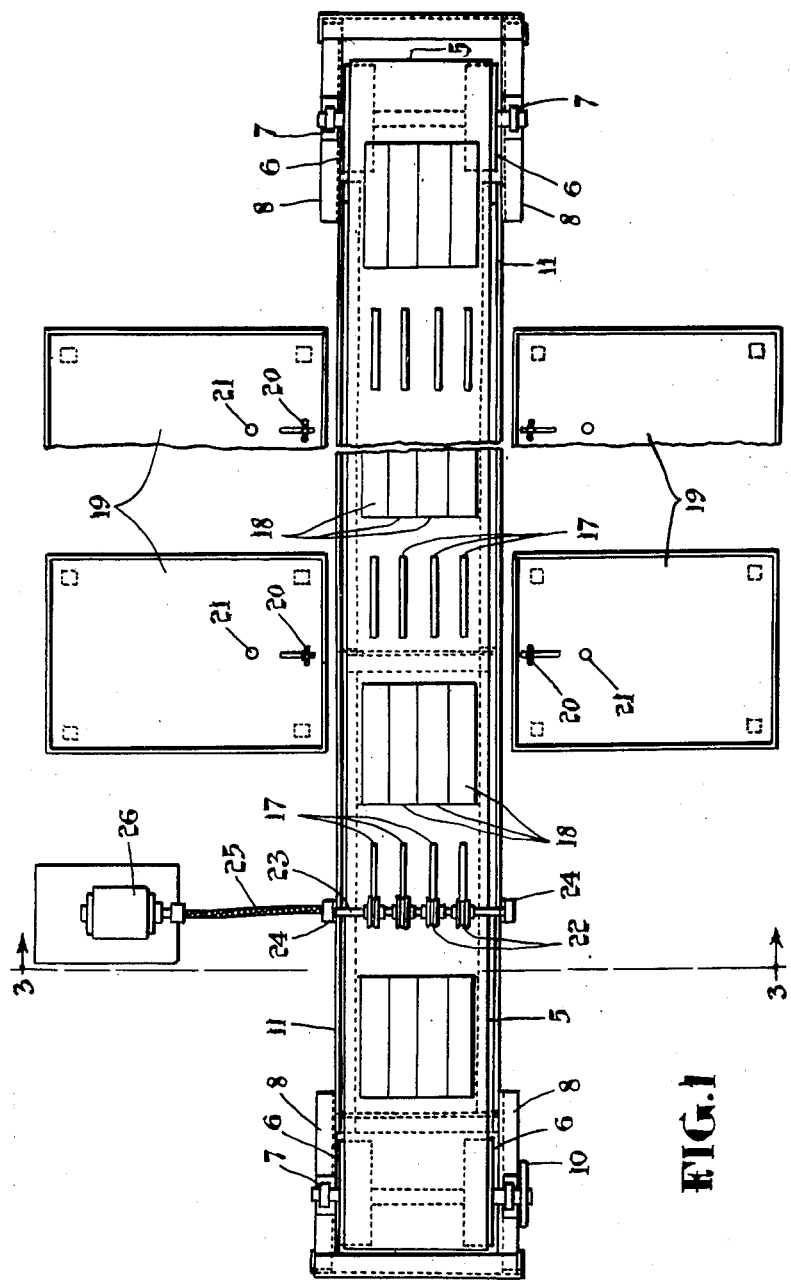
Fig. 1 is a plan view of a preferred apparatus embodying my invention.

Referring more particularly to the drawings, 5 designates an endless conveyor belt trained around end rollers 6 axially journalled in bearings 7 carried by end stands 8. Endless conveyor belt 5 is driven by motor 9 suitably connected to one of the end rollers by drive belt 10 to drive the conveyor belt in the direction indicated by the applied arrows at a relatively low rate of speed. A frame structure including laterally spaced guide rails 11 supported by uprights 12 is arranged between end stands 8. The upper portion of conveyor belt 5 travels along guide rails 11 and is supported thereby while the lower portion of the conveyor belt is returned on supporting rolls 43 carried by uprights 12.

A plurality of mandrel supporting posts 13 are arranged in series of parallel rows suitably spaced about the longitudinal direction of the conveyor belt. Each post is provided with oppositely disposed lugs 14. A storage mandrel 15, preferably of aluminum tubing, having keyways 16 in one end thereof, is adapted to be fitted over mandrel supporting post 13 and is secured thereto by twisting the mandrel to bring the lugs 14 into the horizontal passage of keyway 16. Storage mandrel 15 is then capped by an L-shaped shirring mandrel 17 which is disposed thereon with its free-end directed counter to the direction of travel of the conveyor belt. A plurality of buckets or troughs 18 are permanently mounted in the conveyor belt, being disposed directly in rear of the free end of a shirring mandrel.

Suitably spaced selecting and grading tables 19 are arranged in series on opposite sides of the conveyor belt. Each table is provided with a faucet 20 and a drain 21, and it is here that an operator selects and grades the sausage casings after they have been washed. As soon as the mandrel supporting posts 13 reach the top side of conveyor belt 5 storage mandrels 15 are fitted thereon and locked by lugs 14 in the horizontal passage of keyways 16. These storage mandrels are capped by shirring mandrels 17. As the belt continues on, operators at tables 19, after selecting, washing and grading the casings, fit one end over the free arm of shirring mandrel 17 and place the remainder of the casing in the buckets 18 provided therefor.

A shirring station is provided adjacent the opposite end of the conveyor belt. At the shirring station, a shirring mechanism is brought to bear against the advancing mandrels to shir the casings thereon. According to one embodiment of my invention, the shirring mechanism comprises a plurality of shirring wheels 22 fixed to rotate on a shaft 23 journalled in bearings 24. One end of the shaft is connected by a flexible cable 25 to a motor 26 for rotation counter to the direction of travel of the conveyor belt. Shirring wheels 22 are preferably made of cork and are provided with a peripheral groove, the transverse curve of which corresponds with the cylindrical configuration of the shirring mandrel. The shirring wheels are suitably spaced on shaft 23 in alignment with the longitudinally spaced rows of shirring mandrels.

Shaft carrying bearings 24 are preferably mounted on posts 27 arranged for vertical movement in post supporting sockets 28. Sockets 28 are welded or otherwise secured to the outer side walls of guide rails 11 in the frame structure. Lubricating bushings 29 surround said posts in the sockets 28. Shaft 23 is normally supported by posts 27 so as to arrange shirring wheels 22 in the path of the advancing mandrels sufficiently to cause the shirring wheels to ride up and over the elbow portion of shirring mandrels 17 and to thereby bear down on the horizontal arm of said mandrels, ensuring frictional engagement of the shirring wheels with the casing which has been applied to each mandrel. The shirring wheels are caused to rotate at a speed which will enable the full length of each sausage casing to be shirred onto the shirring mandrel as it is advancing through the shirring station. As soon as shirring mandrels 17 have cleared the shirring station an operator forces the shirred casing around the bend of each shirring mandrel and onto storage mandrel 15. Mandrel 17 is removed from the head of storage mandrel 15 and the storage mandrel with the shirred casing thereon is unlocked and removed from mandrel supporting post 13.

Fig. 5 is an enlarged view of one of the mandrel assemblies mounted on conveyor belt 5. This assembly includes a mandrel supporting post 13, a storage mandrel 15 fitted over and secured to said post by locking lugs 14 in keyways 16, and an L-shaped mandrel 17 capping the storage mandrel. This view also shows, in dotted line, the position of the shirring mechanism with respect to the approaching mandrels, and, in full line, the manner in which said mechanism shirs the casing on the mandrel.

The shirring apparatus according to my invention may be modified on a small scale where it is not practical to employ the gang assembly hereinbefore described. In such cases it may only be required to provide a conveyor belt with a single row of mandrel assemblies suitably spaced in the longitudinal direction of the belt. Then again, it may only be required to employ a single mandrel assembly, the supporting post of which is secured to a table top. In Fig. 6 I have shown a modified form of shirring apparatus. This apparatus includes a single mandrel assembly, similar to that shown in Fig. 4, which may either be installed on a single row conveyor belt or on a table top. In both of the above instances I prefer to use a single wheel portable type shirring mechanism including a cork wheel 30 fixed to rotate with shaft 31 connected to motor 32 by means of flexible cable 33. The shirring mechanism is manipulated by hand, cork wheel 30 being brought to bear against that portion of the casing which is stretched over shirring mandrel 17. In this manner the casing is shirred onto the shirring mandrel and is subsequently transferred to storage mandrel 15 mounted on supporting post 13.

A still further modification of the present invention contemplated is in the provision of an L-shaped shirring mandrel 35 which is fastened directly at its base 36 to either one of the aforementioned conveyor belts or to a table top in substitution for the mandrel assemblies previously described. With the use of this modified type of shirring mandrel the above mentioned alternative types of shirring mechanisms may readily be employed for shirring sausage casings thereon. The shirred casings will then be transferred to storage mandrels which are fitted to the free end of this shirring mandrel.

I claim:

1. In a shirring apparatus of the character described, the combination of a mandrel assembly, including an upright mandrel supporting post, a cylindrical mandrel telescopically fitted on said post and an L-shaped shirring mandrel having one arm fitted over the free end of said first mentioned mandrel with the remaining arm directed horizontally to receive a portion of a sausage casing thereon, and a power actuated shirring element engageable with that portion of the sausage casing carried by said horizontal arm for shirring the casing onto said shirring mandrel.

2. An apparatus as set forth in claim 1, said cylindrical mandrel fitted on said post being provided with grooves adjacent one end thereof and locking lugs carried by the supporting post and receivable in the grooves in locking engagement therewith.

3. An apparatus for preparing sausage casings for sausage stuffing machines comprising a frame structure, a conveyor mounted on said frame, a plurality of shirring mandrels mounted on said conveyor each adapted to receive thereon a portion of a sausage casing, conveyor actuating means for conveying said mandrels past a shirring station and a power actuated shirring element located at the shirring station and adapted to engage that portion of the sausage casing carried by each mandrel to subject the sausage casing to a shirring action whereby the whole length of the casing is forced onto the mandrel in a shirred condition.

4. An apparatus according to claim 3, in which said conveyor includes an endless belt to which said mandrels are secured in spaced relation about the outer surface of said belt conveyor.

5. An apparatus according to claim 3, in which said conveyor comprises power actuated endless belt to which said mandrels are secured in spaced relation about the outer surface of said conveyor belt, and means mounted on the conveyor belt adjacent the free end of each mandrel for receiving the portion of the sausage casing to be shirred onto the mandrel.

6. An apparatus according to claim 3, including means for supporting said shirring element whereby said shirring element is adapted to be moved into and out of shirring engagement with the sausage casing on said shirring mandrel.

7. An apparatus according to claim 3, including means carried by said frame structure for supporting said shirring element for vertical sliding movement characterized in that said element is normally positioned in the path of the moving mandrel, said mandrel being adapted to force the shirring element to ride over the upper surface of the mandrel and in frictional shirring engagement with the sausage casing on said mandrel.

8. An apparatus according to claim 3, in which each of said shirring mandrels comprises an L-shaped tubular member having one arm projecting horizontally for receiving the casing to be shirred thereon, the supporting means carried by said conveyor and a second mandrel mounted on said supporting means in an upright position over which the other arm of said L-shaped member is telescopically fitted.

9. An apparatus according to claim 8, said supporting means comprising an upright post adapted to be telescopically fitted within said second mandrel, and locking lugs carried by said post, said lugs being receivable in grooves provided adjacent one end of said second mandrel for securing said second mandrel to the post.

EDWARD FLOMEN.

REFERENCES CITED

The following references are of record in the file of this patent:

UNITED STATES PATENTS

| Number | Name | Date |
|---|---|---|
| 1,616,971 | Henderson | Feb. 8, 1927 |
| 2,010,626 | Dietrich | Aug. 6, 1935 |
| 2,231,954 | Scherubel | Feb. 18, 1941 |